Oct. 23, 1956 R. D. MITCHELL 2,767,913
DEVICE FOR COMPUTING RELATIVE MOTION PROBLEMS
Filed Jan. 19, 1955 5 Sheets-Sheet 1

Inventor
Robert D. Mitchell
By
Harry B. Rook,
Attorney

Oct. 23, 1956  R. D. MITCHELL  2,767,913
DEVICE FOR COMPUTING RELATIVE MOTION PROBLEMS
Filed Jan. 19, 1955  5 Sheets-Sheet 2

Inventor
Robert D. Mitchell
By Harry N. Cook,
Attorney

Oct. 23, 1956  R. D. MITCHELL  2,767,913
DEVICE FOR COMPUTING RELATIVE MOTION PROBLEMS
Filed Jan. 19, 1955  5 Sheets-Sheet 4

Inventor
Robert D. Mitchell
By
Attorney

Oct. 23, 1956  R. D. MITCHELL  2,767,913
DEVICE FOR COMPUTING RELATIVE MOTION PROBLEMS
Filed Jan. 19, 1955  5 Sheets-Sheet 5

Inventor
Robert D. Mitchell
By Harry B. Cook, Attorney

United States Patent Office 2,767,913
Patented Oct. 23, 1956

2,767,913

DEVICE FOR COMPUTING RELATIVE MOTION PROBLEMS

Robert D. Mitchell, South Orange, N. J.

Application January 19, 1955, Serial No. 482,701

7 Claims. (Cl. 235—61)

This invention relates to a device for solving more rapidly and without sacrifice of accuracy, relative motion problems of the type encountered in the navigation of a ship or aircraft. However, the basic principle of this invention may be adapted for a variety of other uses, one of which shall be described herein. The various computers now in general use by navigators of ships or aircraft require manual plotting of a part or all of the relative motion triangle. The computer described herein reduces the amount of manual plotting to a minimum since the magnitude and direction of each side of the relative motion triangle may be graphically represented without any plotting.

An object of this invention is to provide a device of the character described which will graphically and without the necessity of plotting, reproduce any possible triangle where the direction and magnitude of any or all of its sides may be specified, and where the quantities of magnitude and direction may be determined by inspection to the limits required for accurate navigating. This device will also graphically reproduce the other parts of the relative motion problem discussed in Commander Benjamin Dutton's text-book, "Navigation and Nautical Astronomy," published by the United States Naval Institute. In the following description, I shall make use of the symbolic analysis of the relative motion problem employed by Dutton, since these symbols are understood by air and sea navigators and considerably simplify any discussion of relative motion problems.

The invention as illustrated herein resides in a combination of a transparent slide and a series of disks having scales and other features engraved upon their surfaces so as to provide first, for graphic and mechanical representation of the angular direction and magnitude of any of the sides of the relative motion triangle, and second, for a plotting surface where bearings and ranges, relative distances, or reference points common to two or more relative motion triangles may be conveniently plotted if necessary.

Figure 16:
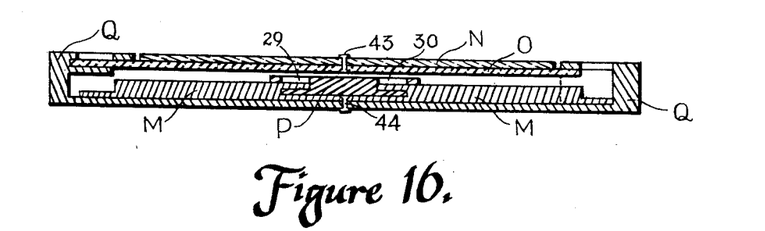
Figure 16 is a central transverse vertical sectional view through the modified computer with all parts in their assembled zero relation.
Figure 17:
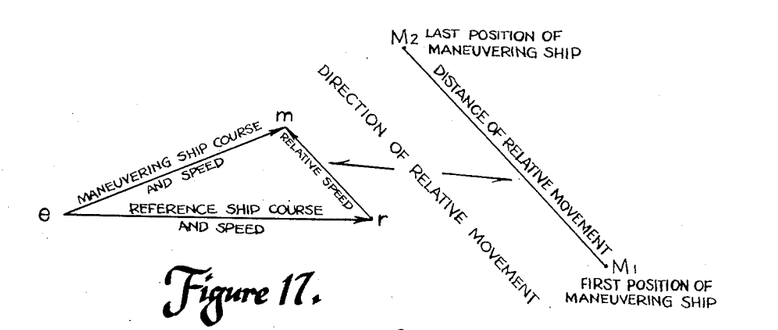
Figure 17 is a relative motion triangle used for problems of sea navigation and showing the symbolic analysis employed by Dutton.
Figure 18:
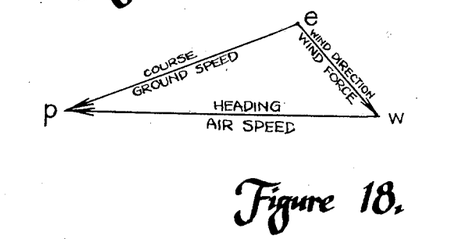
Figure 18 is a relative motion triangle used for problems of air navigation and showing the symbolic analysis employed by Dutton.

Other objects, advantages, and results of the invention will appear from the following description read in conjunction with the accompanying drawings, in which Figures 1 through 8, refer to a single computer embodying my invention and Figures 9 through 16, refer to a second computer embodying my invention, but with a specialized use described herein. Figures 17 and 18 both refer to the first embodiment. While both computers have identical or similar elements, they necessarily take their specific forms from the nature of the problems they have to solve. In general, the first embodiment is designed to solve relative-motion problems involving one or more relative-motion triangles, such as triangle $erm$ shown in Figure 17; and in addition, bearings and ranges, relative distances, or reference points common to two or more relative motion triangles may be conveniently plotted on a surface provided for this purpose. The line M1—M2 shown in Figure 17 represents such a plotted relative distance. A characteristic of relative motion problems is that the relative distance plot must run parallel to a specific side of the relative motion triangle; in Figure 17 line M1—M2 runs parallel to side $r$, $m$. This characteristic accounts for the basic difference in design between the first and second embodiments.

The problems solved by the second embodiment require no plotted relative distances, hence there need be no provision for plotting and no provision for making such plots run parallel to one side of the relative motion triangle. It should become manifest in the following description of the elements of these two embodiments, that they are almost identical, with the exception of the parallel lines engraved in the surface of disk B of the first embodiment shown in Figures 1, 3, and 4. The purpose of these parallel lines is to allow relative distances to be plotted parallel to one side of the relative motion triangle.

These and other objects and advantages of the invention will become apparent from the following specification, when taken with the accompanying drawings. In the drawings wherein like references denote like parts in the several views.

Figures 1, 4A:
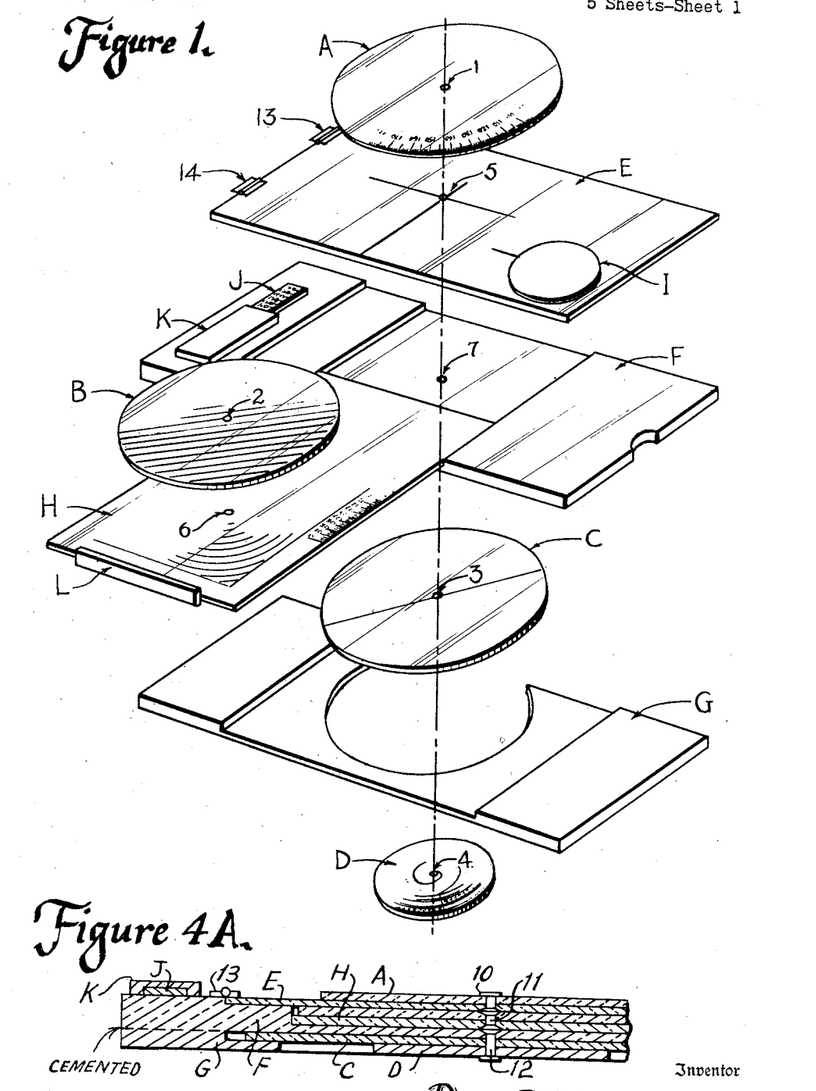
Figure 1 is an exploded view of the first embodiment showing its various mechanical constituents without their entire markings.
Figure 4A is an enlargement of a portion of Figure 4.
Figures 5, 6, 7, 8:
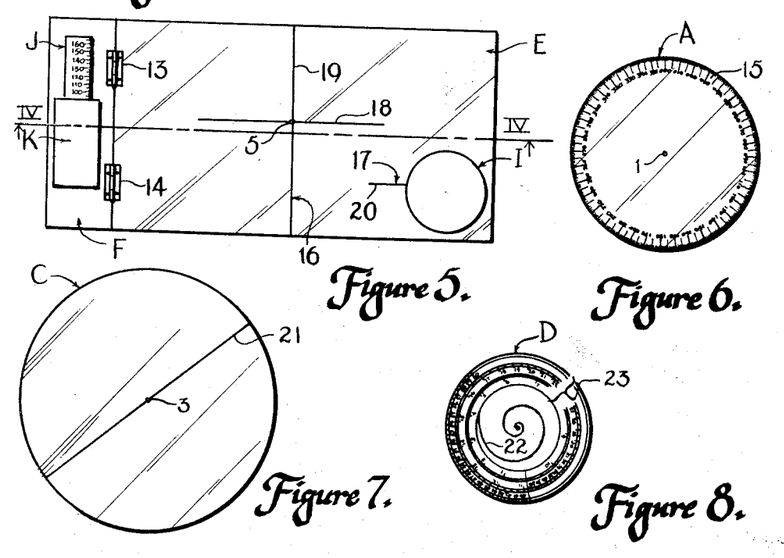
Figure 5 is a top plan view of the hinged top section E of the computer.
Figure 6 is a top plan view of the transparent rotatable disk A that is pivoted on said hinged top section.
Figure 7 is a top plan view of the transparent rotatable disk C that is pivoted on the underside of the upper section F of the body F—G of the computer.
Figure 8 is a top plan view of the opaque desirably white rotatable disk D that is pivoted on the underside of the disk C shown in Figure 7.

For ease in description, the parts of the computer have been designated as follows:

*Disk A.*—Disk A is shown in Figures 1 and 6; it is pivoted on transparent flap E at the point of intersection 5 of the vertical line 19 and horizontal line 18 engraved on the surface of said flap shown in Figure 5. The periphery of this transparent disk is engraved with 360 degrees with every 10 degrees numbered and shown as scale 15 in Figure 6. It is read at point 16 on flap E above the vertical line 19 engraved thereupon.

Figures 2, 3, 4:
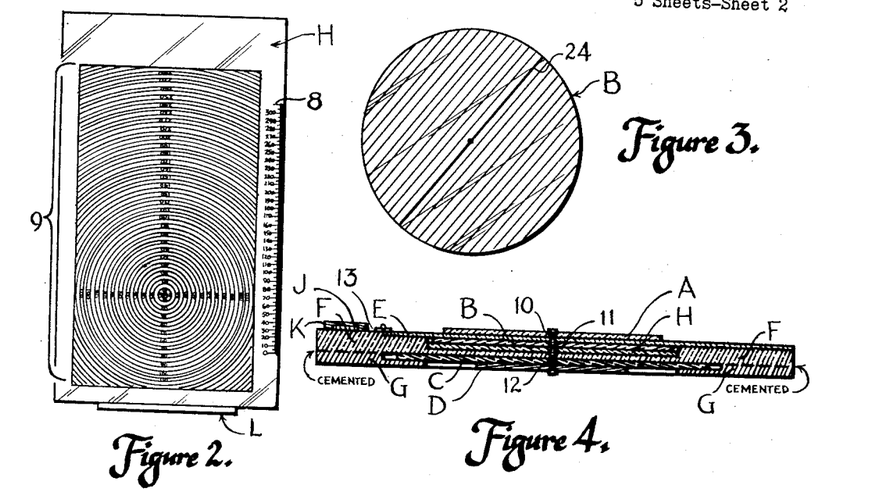
Figure 2 is a top plan view of the transparent slide H.
Figure 3 is a top plan view of the transparent rotatable disk B that is pivoted on said slide.
Figure 4 is a transverse vertical sectional view through the computer with all parts in their assembled relation taken approximately on the line IV—IV of Figure 5.

*Disk B.*—Disk B is shown in Figures 1 and 3. This transparent disk has one diametral line 24 engraved heavily upon its surface and other parallel lines engraved more lightly at successive distances of one centimeter from this diametral line.

*Disk C.*—Disk C is shown in Figures 1 and 7. This transparent disk has one diametral line 21 engraved upon its surface. It is pivoted at point 7 on the underside of the body section F shown in Figures 1 and 4.

*Disk D.*—Disk D is shown in Figures 1 and 8. This disk is opaque and desirably white in color. Printed on its surface is a spiral line 22 and a peripheral scale 23 that represents distances. If a straight line is drawn from the center 4 to the edge of disk D, the distance from the center 4 to the point of intersection of the straight line and the spiral line may be read on the periphery of disk D at the point where the straight line cuts the peripheral scale 23. In reading this distance, it is necessary to select the proper part of the peripheral scale, which circles disk D two and one half times to correspond with the spiral line. The distances printed in the peripheral scale are given in millimeters to correspond with all other scales in the computer. The diametral line 21 engraved upon the surface of disk C functions as any straight line drawn from the center 4 to the edge of disk D.

*Slide H.*—Slide H is shown in Figures 1 and 2. It is transparent and engraved upon its surface with concentric circles and segments thereof in the pattern 9 shown. These circles are engraved 5 millimeters apart with each 10 millimeters numbered as shown. The common center of these circles is coincident with the zero position described below when slide H is pushed to bring stop L against the edge of body section F. On the right side of the slide, a metric scale 8 is engraved with each 10 millimeters numbered. When stop L is pushed against the body of the computer, the zero position of this scale will fall directly beneath the line 20 engraved on flap E at point 17 in Figure 5.

*Flap E.*—Flap E is shown in Figures 1 and 5. Flap E is the transparent hinged top section of the computer and is engraved with a horizontal line 18 and a vertical line 19 intersecting at 5. It is also engraved at point 17 with an additional short horizontal line 20 beneath and to the right of the first one. It is beneath line 20 at 17 that scale 8 is read. The flap is secured to the body of the computer by means of two hinges 13 and 14 on its left side.

*Time-speed-distance calculator.*—Attached to the surface of flap E in the lower right corner is a time-speed-distance calculator of the conventional type now widely employed by navigators. It is shown in Figures 1 and 5. The markings of this calculator are not described since it does not form an essential part of the computer described herein, but is used only to speed the solution of maneuvering board problems. Its function is to provide time, speed, or distance where two of those quantities are known.

*Zero position.*—The zero position is the point about which disks A, C and D rotate permanently, and about which disk B rotates when the stop L is pushed against the body of the computer i. e. so that scale 8 engraved upon the surface of slide H reads zero.

*Portable scale J.*—On the left side of the top of the body of the computer shown in Figures 1 and 5, a pocket K is provided containing a transparent metric scale J with every 10 millimeters numbered. This scale is portable so that it can be used to measure plotted distances on the surface of disk A (see Problem 2 to follow).

Descriptions of the symbols employed by Dutton in his analysis of the relative motion problem follow:

*Point e.*—Point $e$ is shown in Figures 17 and 18 and is the vertex of each of these relative motion triangles representing the earth or the standard to which all motion is relative. In Figure 17, it is also the point at which the observer is assumed to be located when taking bearings and ranges of the second moving body.

*Point r.*—Point $r$ is shown in Figure 17 and is the vertex of the relative motion triangle representing the moving body upon which the observer is stationed.

*Point p.*—Point $p$ is shown in Figure 18 and is the vertex of the relative motion triangle representing the aircraft in which the observer is stationed.

*Point m.*—Point $m$ is shown in Figure 17 and is the vertex of the relative motion triangle representing the second moving body. As described herein it may also represent the true wind.

*Point w.*—Point $w$ is shown in Figure 18 and is the vertex of the relative motion triangle representing the true wind (true wind is defined above).

*Vector em.*—Vector $em$ shown in Figure 17 is the vector of the relative motion triangle representing the true course and speed of the second moving body or of the true wind.

*Vector er.*—Vector $er$ shown in Figure 17 is the vector of the relative motion triangle representing the true course and speed of the moving body upon which the observer is stationed.

*Vector rm.*—Vector $rm$ shown in Figure 17 is the vector of the relative motion triangle representing the relative motion between the two moving bodies.

*Point M1.*—Point M1 shown in Figure 17 is the point representing a first bearing and range of a second moving body from the moving body upon which the observer is stationed. It is often accompanied with the time the bearing and range were observed. Bearings and ranges in Figure 17 were measured from point $e$.

*Point M2.*—Point M2 shown in Figure 17 is the point representing a second bearing and range of the second moving body from the moving body upon which the observer is stationed.

Figure 9:
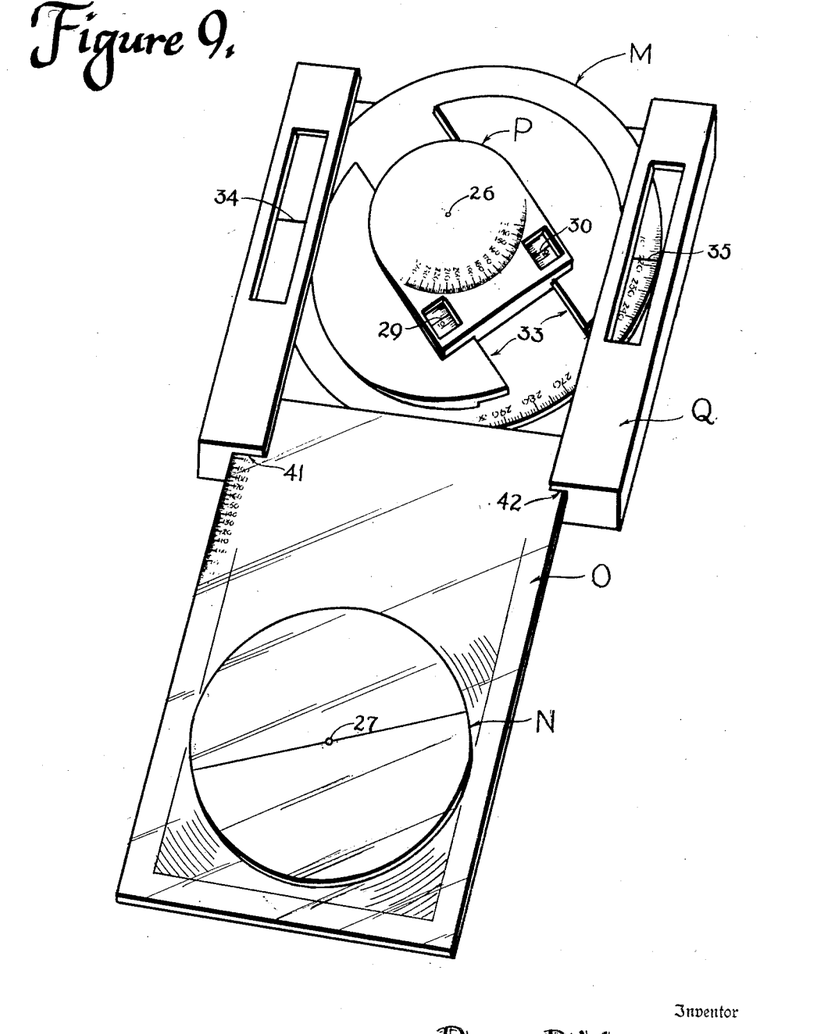
Figure 9 is a diagonal view of a modified form of the computer shown without all markings and which has been designed for the purpose of indicating the velocity and direction of the true wind (wind observed when a ship is dead in the water) from inputs of velocity and direction of the apparent wind (wind observed from the deck of a ship while that ship is moving through the water).
Figure 14:
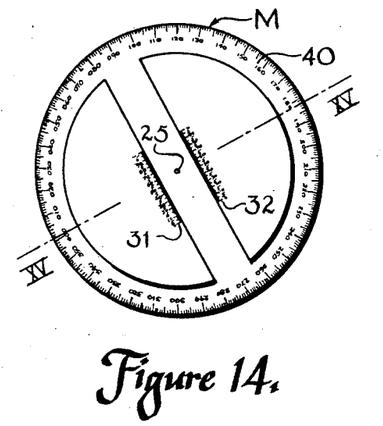
Figure 14 is a plan view of the opaque desirably white rotatable disk M pivoted on the upper side of the body of the modified computer.
Figure 15:
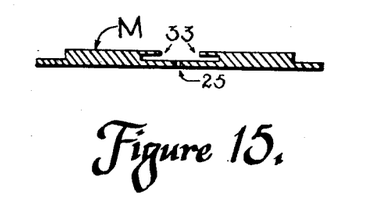
Figure 15 is a transverse vertical sectional view through the said disk M illustrated in Figure 14 taken approximately on the line XV—XV.

The various disks and scales of the modified computer, shown in Figure 9, have been designated with letters and numbers respectively to facilitate the description of its operation to follow. This second embodiment has been designed solely for the purpose of indicating the velocity and direction of the true wind (wind observed from land or a ship dead in the water) from inputs of velocity and direction of the apparent wind (wind observed from the deck of a ship while that ship is moving through the water);

*Disk M and scales 31 and 32.*—The periphery of this opaque white disk shown in Figures 9 and 14, designated disk M is engraved with 360 degrees with every 10 degrees numbered. This peripheral scale is designated scale 40 in Figure 14. The pivot 44 at the center of disk M is made flush on its upper extremity as shown in Figure 16 so as to allow slide P upon which rose 39 is printed to move freely in track 33 over the surface of disk M. On each side of this track a metric scale 31 and 32, is printed on the surface of disk M with each 5 millimeters numbered, as shown in Figure 14. The peripheral scale 40 of disk M is read at point 35 shown in Figure 9 where a horizontal hairline is mounted in the body Q of the computer, and beneath which the peripheral scale 40 moves.

*Slide P.*—On the surface of disk M, a track 33 is provided in which slide P moves. Slide P is constructed of opaque white material. Printed on its surface is a rose of 360 degrees with every 10 degrees numbered and designated 39 in Figure 12. The purpose of slide P is to provide a mounting for rose 39 so that its center 26 may be offset from the center 25 of disk M along a radius of disk M. This offset is measured on scale 31 and 32 which are read at points 29 and 30 beneath hairlines mounted in the body of slide P. When slide P is oriented so that the center 25 of disk M and the center 26 of rose 39 coincide, scales 21 and 32 will read zero beneath the hairlines at points 29 and 30. It will be noted that rose 39 is offset 90° from peripheral scale 40 of disk M, i. e. when 000° appears beneath the hairline at point 35 in Figure 9, 000° on rose 39 is pointing in the same direction as 090° on scale 40. Actually this 90° offset is necessary to coordinate rose 39 with scale 40. When 000° reads beneath the hairline at point 35, the direction of offset of slide P and of slide O shown in Figures 9 and 10 is the same i. e. 000° as indicated on rose 39.

Figure 10:
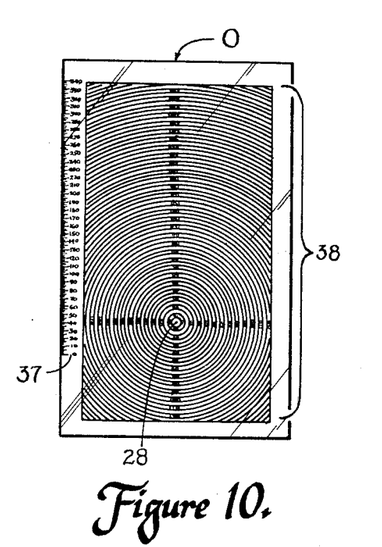
Figure 10 is a plan view of the transparent slide O of the modified computer.

*Slide O and scale 37.*—The surface of this transparent slide O is engraved with concentric circles and segments thereof in the pattern 38 shown in Figure 10. These circles are engraved at distances of 5 millimeters successively from their common center 28 and each 10 millimeters is numbered. On the left side of slide O a metric scale 37 is engraved with each 10 millimeters numbered. Slide O rides in track 41 and 42 (shown in Figure 9) provided in the main body Q of the computer. The scale 37 is read at point 34 under the horizontal hairline mounted in the body Q of the computer.

Figure 11:
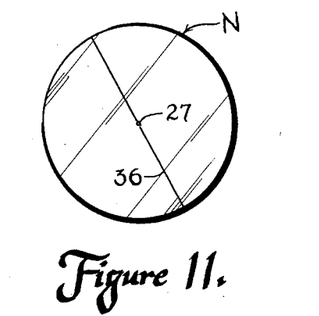
Figure 11 is a plan view of the transparent rotatable disk N that is pivoted on said slide illustrated in Figure 10.
Figure 12:
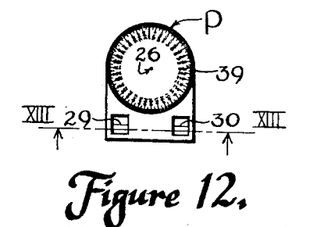
Figure 12 is a top plan view of the opaque white slide of the modified computer.
Figure 13:
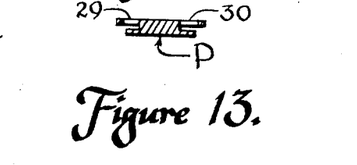
Figure 13 is a transverse vertical sectional view on the line XIII—XIII of Figure 12 in the direction of the arrows.

*Disk N.*—The surface of transparent disk N is engraved with a single diametral line 36 shown in Figure 11. It is pivoted about its center 27 at point 28 on slide O as shown in Figure 9. This pivot 43 is made flush on its lower extremity as shown in Figure 16.

*Zero position.*—The zero position is the point about which disk M rotates permanently, about which rose 39 rotates when slide P is set on zero, and about which disk N rotates when scale 37 reads zero beneath the hairline at point 34. The zero position is only one point.

For the first embodiment only, the method of reading the magnitude and direction of each side of the relative motion triangle such as that shown in Figure 17, follows: One side of the triangle, *er* for example, is represented by the offset of slide H from the zero position. The magnitude of this offset is read on scale 8 at point 17 in Figure 5 through the transparent flap E upon which line 20 is engraved directly above this scale. The second side of the triangle, *rm* for example as shown in Figure 17, is represented by the diametral line 21 engraved upon the surface of disk C, its magnitude indicated by the intersection of this diametral line and the spiral line 22 printed upon the opaque surface of disk D. This magnitude may be read at the periphery of disk D directly beneath the diametral line 21 where the numerical scale 23 is printed for this purpose. The remaining side of the triangle, *em* in Figure 17, is represented by the diametral line 24 engraved upon the surface of disk B which must be oriented so as to pass through the extremity of the second side (away from the zero position). The magnitude of this last side may be read directly by means of the concentric scale 9 (shown in Figure 2) engraved on the surface of slide H. The direction of the first side may be read on disk A at point 16 shown in Figure 5. The direction of the second side is read directly on disk A. The direction of the third side is read on disk A after slide H has been returned to the zero position i. e. so that stop L is against the body of the computer. The function of stop L is to allow this to be done rapidly.

It must be emphasized that the relative motion problem can exist only when various parts of the triangle are unknown. When all parts are known, the problem is solved. Since the unknown parts vary with each problem, it may be necessary to assume that any one of its vertices is at the zero position. In complex problems involving more than one relative motion triangle, different vertices of two or more relative motion triangles may be assumed to be at the zero position. In general, however, point *e* is placed at the zero position since both vectors *em* and *er* in Figure 17, vectors *ep* and *ew* in Figure 18, may be measured in radial direction from the same center point *e*, and since in the first embodiment, only one element disk A is provided to measure such radial direction, the problem is simplified by placing point *e* at the zero position. This is not a hard and fast rule, it is only a guide to simpilfy the solution of problems.

In the first embodiment, pivot 11 shown in Figure 4 is made flush on both its extremities while pivot 10 shown in Figure 4 is made flush on its lower extremity and pivot 12 shown in Figure 4 on its upper extremity. Disk D is pivoted to the lower side of disk C on the same axis by pivot 12. It is secured in place by means of a ferrule or flange on the lower extremity of this pivot. Disk C is supported on its lower side by the body section G shown in Figure 1 of opaque white material which has been cut through in a circular pattern to allow access to the lower sides of disk C and disk D. Disk C is pivoted beneath the transparent body section F.

In the second embodiment, the nature of the problem it solves does not require the navigator to actually visualize the complete relative motion triangle on the face of the computer. It is possible, however, to account for all three sides of this triangle as in the first embodiment. In problems of the type solved by this embodiment, the true wind may be considered to be a body in motion, and hence in Figure 17, vector *em*, can represent the force and direction of the true wind as well as the velocity and direction of a moving body. Vector *er* still represents the velocity and direction (course) of the observer's ship. Vector *rm* represents the velocity and direction, then, of the apparent wind (wind observed from the deck of a moving ship as opposed to wind observed from land which is true wind). In the second embodiment, vector *rm* is represented by the offset of slide O from the zero position, its magnitude being read beneath hairline 34. The direction of vector *rm* is always the direction of the slide O as it passes through tracks 41 and 42. Side *re* of the triangle *erm* is represented by the offset of slide P and hence of center 26 of rose 39 from the zero position. Its magnitude is read on scales 31 and 32. Vector *em* in triangle *erm* is represented by a segment of diametral line 36 after it has intersected center 26 of rose 39. Center 26 always represents point *e*, and center 27 of disk N always represents point *m*, hence vector *em* is that segment of diametral line 36 which connects center 26 with center 27. Its magnitude is read by employing the concentric scale 38 of slide O and its direction is indicated by the intersection of diametral line 36 with the graduations of rose 39 in the direction *em*. Normally the direction of the wind is given as the direction from which it is blowing, but rose 39 is so oriented as to give the direction from which the wind is blowing directly when the vector is read from center 26 of rose 39 toward center 27 of disk N.

It is, of course, possible to solve the problem for which the second embodiment was designed, by the first embodiment, and hence it follows that the parts of the first embodiment correspond to those of the second embodiment. These similarities of design follow: The scale 15 of disk A shown in Figure 6, corresponds to the scale 40 of disk M, shown in Figure 14. Diametral line 21 shown in Figure 7 corresponds to the direction of radial offset of slide P, shown in Figure 13, along track 33 shown in Figure 15. Peripheral scale 23 of disk D shown in Figure 8 corresponds to scales 31 and 32 shown in Figure 14, and hence the orientation of disk D beneath disk C corresponds to the position of slide P along track 33. Slide O shown in Figure 10 corresponds exactly to slide H shown in Figure 2, as do scales 8 and 37 or 9 and 38, shown in the same figures. Disk N shown in Figure 11 corresponds to disk B shown in Figure 7 as do diametral lines 24 and 36 shown in the same figures. Both the graduations of rose 39, shown in Figure 12, and of scale 40, shown in Figure 14, correspond to those of scale 15, shown in Figure 6. There is no provision in the second embodiment for scale J, or pocket K, shown in Figure 5, for time-speed-distance calculator I shown in Figure 5 or the parallel lines on the surface of disk B, shown in Figure 3. There are other minor similarities, such as that between hairline 34, shown in Figure 9, and line 20, shown in Figure 5, or between hairline 35 and point 16 on line 19, shown in the same figures. Line 19 in Figure 5 has no parallel in the second embodiment. The first embodiment is more flexible than the second embodiment; it can solve many kinds of relative motion problems. The second embodiment can only solve one kind of problem, but it can do this more rapidly. In addition, the first embodiment is designed so that plotting may be done directly on the surface of disk A, since it corresponds, for example, to the surface of a radar scope and ranges and bearings may be conveniently plotted. The parallel lines of disk B shown in Figure 3, are provided to allow relative distance lines such as M1—M2, shown in Figure 17, to be paralleled with the side rm of the relative motion triangle erm.

In solving relative motion problems of which 5 typical examples are provided, the operation of the first embodiment is as follows:

*Problem I.*—A plane, air speed 140 knots, is to fly a course of 020°. The wind is 40 knots from 100°. Desired: True heading and ground speed.

*Definitions.*—Reciprocal: The angle 180° away from i. e. opposite to the given angle. Air speed: The actual speed of the aircraft through the air measured along the heading. Heading: The average direction in which the longitudinal axis of the aircraft is headed. True heading is with respect to true north. Course: The intended path of travel over the surface of the earth with respect to north. Ground speed: The speed made good or expected to be made good over the earth's surface, measured along the course. Drift angle: The angular difference between the heading and the course. Drift angle is always measured right or left from the heading to the course. The relative motion triangle to be solved is shown in Figure 18.

Let the zero position represent point e and make sure stop L is against the body of the computer. In this instance point e may easily be located at the zero position since vector ew is given and the direction of vector ep is given. The magnitude of vector wp is given, hence by establishing the angular difference between vectors ep and ew, and by applying a vector corresponding to the magnitude of the air speed to the termination of vector ew at point w, point p may be established.

(1) Set disk A on 020° at point 16 shown in Figure 5. This is the desired course, corresponding to the direction of vector ep in Figure 18.

(2) Set disk C on 280° where it appears on disk A after step 1 has been accomplished. 280° is the reciprocal of 100° (180°+100°) and represents the wind direction.

(3) In order to set in the wind vector ew, set disk D on 40, i. e. so that the peripheral scale reads 40 beneath the diametral line 21 engraved on the surface of disk C. The intersection of spiral line 22 with diametral line 21 serves to establish point w of vector ew.

(4) Set slide H so that the 140 circle on the concentric scale 9 intersects the extremity of vector ew at point w. Orient disk B so that the diametral line 24 passes through point w. The first embodiment is designed to allow this to be done up to speeds of 140 knots, but if higher speeds are desired, a half scale on all speeds of the same problem must be employed, i. e. so that 70 knots on scale 8, for example, represents 140 knots.

The offset of slide H represents the vector ep. Read the ground speed directly on scale 8 as 128 knots.

(5) Return slide H to the zero position and read on disk A the true heading 036° by the position of the diametral line 24 engraved on the surface of disk B. Care must be taken to read the true heading in the direction wp as opposed to the direction pw (this is a characteristic of all drift problems).

According to the definition above, drift angle is to the left. As long as drift problems are solved in this way, drift angle may be determined by whether true heading falls on the right or left of point 16 on line 19.

*Problem II.*—You are on course 070°, speed 16 knots. At 0900 you sight an enemy vessel bearing 080°; distant 18,000 yards. At 0930, the enemy ship bears 120.5°, distant 16,500 yards.

*Required.*—(1) Direction of relative motion of the enemy ship with respect to your ship. (2) Course of the enemy ship. (3) Speed of the enemy ship.

*Solution of Problem II.*—Let the zero position represent point e and make sure stop L is against the body of the computer. The relative motion triangle to be solved is shown in Figure 17. Here vector er is given; the direction of vector rm may be established by noting the direction of M1—M2, and its length may be determined by solving for relative speed in the formula $D=rt$. Point m thus established allows for vector em also to be established.

(1) Set disk A on 080° (in the same manner as in Problem 1); plot a point with a China marking pencil, on the 90 circle directly on the surface of disk A. NOTE.—the 90 circle is actually engraved on the surface of slide H. The plotted point represents 9 nautical miles or 18,000 yards in the direction 080° from the zero position. This is point M1. Mark this point with the time 0900.

(2) Set disk A on 120.5°. Plot a point on the 82.5 circle (representing 8 and one quarter nautical miles or 16,500 yards). Mark this point with the time 0930. This is point M2.

(3) Set disk A on 070°. This is your course.

(4) Orient disk B so that the parallel lines engraved upon its surface are parallel with the direction established by points M1 and M2. This is the direction of relative motion and may read on disk A as 197° (read in the direction M1 toward M2 on the periphery of disk A, the point in degrees established by the diametrial line 24 engraved on the surface of disk B).

(5) Offse the slide H to 16 knots as indicated on scale 8 at point 17. This is your speed.

(6) Measure the distance between M1 and M2 with the portable scale J provided and determine the relative distance according to the scale employed in step (1); 1 nautical mile=10 mm. This distance is 6.3 nautical miles.

(7) With the aid of the "time-speed-distance" computer, determine the relative speed. In this case the time elapsed is half an hour and the relative speed can be determined mentally as 12.6 knots, being double the relative distance.

(8) Establish the vector rm by orienting the diametral line 21 engraved on disk C so that it passes through point m, i. e., so its cuts off a radial segment of the diametral line 24 engraved on the surface of disk B in the direction M1 toward M2 which is equal to the relative speed. Measure this distance by means of the concentric scale 9 engraved on the surface of slide H. The diametral line 21 engraved on the surface of disk C will now point in the direction from the center 1 of disk A toward point m (the vector em) to a position on the peripheral scale of disk A. This is the course of the enemy ship: 118°.

(9) Rotate disk D so that the spiral line 22 printed thereupon intersects the point m established above. The length of vector em may now be read directly on the peripheral scale of disk D as 13.0 knots.

The next two problems employ more than one relative motion triangle and for this reason the use of subnumerals is necessary in differentiating vertices of the triangles. Problem III concerns the maneuvering of a destroyer on a torpedo run and hence one relative motion triangle involves only the destroyer and the enemy ship. The second relative motion triangle involves only the torpedo and the enemy ship. The two triangles are related with respect to the plot of relative distance and the vector representing course and speed of the enemy ship. In solving this problem it will be necessary to refer to Figure 17. Problem IV concerns two triangles such as the one shown in Figure 18. Only part of each triangle is known and they have a common vector. Problem V is the only kind of problem by the second embodiment. Two methods of solving it with the first embodiment are described.

*Problem III.*—Situation: You sight an enemy cruiser bearing 080° from your destroyer, distant 20,000 yards. Planes report the enemy course as 010°, estimated speed 16 knots. Your have steam for 32 knots and are equipped with torpedoes that can be set for any speed from 27 to 45 knots.

*Decision.*—Launch torpedo attack from a range of 12,000 yards with a track angle of 280°, the torpedoes to reach the target 8 minutes after firing. (NOTE.—Track angle is the angle between the target course and the reciprocal of the torpedo course, measured from the bow of the target to the right through 360.)

*Require.*—(1) Your approach course at 32 knots. (2) Time to reach firing position. (3) Bearing of cruiser at instant of firing. (4) Torpedo course. (5) Torpedo speed. (6) Torpedo run (the actual distance traveled by the torpedo from the instant it leaves the firing ship until it reaches the target).

*Solution.*—(1) Let the zero position represent point *e* and make sure stop L is against the body of the computer.

(2) Set disk A on 010° to represent the course of the target ship.

(3) Offset slide H to 16 knots as indicated at point 17 on scale 8. This represents the speed of the target ship. For ease in locating this position of offset later, mark a small cross with china marking pencil on the surface of disk A directly over the center of disk B. The point thus marked is point *m*. Steps 1, 2 and 3 are concerned with establishing the vector *em*. This is the most important vector in the torpedo problem and hence is established first.

(4) Mentally determine the torpedo course by means of the track angle. It is the reciprocal of the sum of the target course 010° and the track angle 280°. 010°+280°+180°=110°. As soon as we can determine the speed of the torpedo, we shall be able to complete the relative motion triangle *emr*$_2$ in which vector *em* represents the velocity and speed of the target ship, and vector *er*$_2$ represents the velocity and speed of the torpedo. The designation 2 is added to point *r* in order to indicate that the relative motion triangle *emr*$_2$ is distinct from the other relative motion triangle involved in this problem *emr*$_1$, which is composed of the vectors, *em*, *er*$_1$, representing the approach course and speed of your destroyer, and *r*$_1$*m* representing the relative speed and the direction of relative motion between the target ship and your destroyer on its approach course and speed. Since we do not know exactly where point *r*$_2$ is located, but we do know that it is somewhere along a line 110° from point *e*, we may indicate this line by orienting disk C so that the diametral line 21 passes through 110° after slide H has been returned to the zero position.

(5) A consideration of the time of torpedo run, 8 minutes, and the torpedo range 12,000 yards, yields a relative speed of 45 knots between the torpedo speed and the speed of the enemy ship. This is accomplished by dividing the range 12,000 yards or 6 nautical miles by eight-sixtieths of one hour. The length of vector *r*$_2$*m* represents this relative speed.

(6) Offset slide H as in step 3, and orient the diametral line 24 of disk B so that it intersects the diametral line 21 of disk C directly on the 45 knot circle of concentric scale 9 engraved on the surface of slide H. Point *r*$_2$ is thus established at this intersection and the relative motion triangle *emr*$_2$ at this moment appears upon the face of the computer; it is composed of segments of lines 19, 21 and 24. Mark a small cross on the surface of disk A at point *r*$_2$ with China marking pencil.

(7) Since the vector *er*$_2$ represents the speed of the torpedo, the line representing the distance of relative motion, M1—M2, must terminate at point *e*, if there is to be a collision of torpedo and target ship. This line must originate at the distance from the target ship at which the torpedo was fired. For the relative motion triangle *emr*$_1$ there will be another line M1—M2 originating with M1 at a point 20,000 yards, bearing 080° from point *e* and terminating at the point at which the torpedo is fired, i. e. at point M1 of the relative motion triangle *emr*$_2$. In order to prevent confustion of points, we may consider these three points (M2 of the triangle *emr*$_1$ is M1 of the triangle *emr*$_2$) to be mutually related and hence label point *e*, M3; the common point, M2; and the point 20,000 yards 080° from point *e*, M1. The imaginary line M2—M3 is parallel to and is extended in the same direction as the vector *r*$_2$*m* established in step 6. Return slide H to the zero position and mark small cross at the point where the diametral line 24 of disk B intersects the 60 knot circle (60 knots representing 6.0 nautical miles or 12,000 yards). The point thus marked is point M2 and should be so designated. Care must be taken to insure that the direction M2—M3 corresponds to the direction *r*$_2$*m*.

(8) Plot M1, the position of the cruiser at the start of the problem as follows: M1 will be plotted at the 100 knot circle on the surface of disk A (100 knot circle represents 10.0 nautical miles or 20,000 yards in accordance with the scale adopted for the relative distance plot in step 7), by orienting the diametral line 24 of disk B so that it passes through 080° as indicated on the peripheral scale 15 engraved on the surface of disk A. A small cross and the designation M1 should be written with China marking pencil at this point.

(9) Orient disk B so that the lines engraved thereupon run parallel to the points M1 and M2. This is the direction of relative motion parallel to the vector *r*$_1$*m*.

(10) Point *r*$_1$ will be located on the 32 knot circle and in such a position that the resulting vector *r*$_1$*m* runs parallel to and in the same direction as M1—M2. Place a small cross on the surface of disk A at the 32 knot circle of the concentric scale 9 engraved on the surface of slide H, but in such a position that an imaginary line running from *r*$_1$ to *m* will parallel the lines engraved on disk B. The point thus established is *r*$_1$, and by orienting the diametral line 24 of disk B so that it passes through this point, the direction of the vector *er*$_1$ (your approach course) may be read on the surface of disk A as 027.5°.

(11) From a consideration of the relative speed *r*$_1$*m*, which may be measured by means of the portable scale J, as 17.3 knots, and the relative distance M1—M2, measured the same way and converted to the relative distance scale employed in steps 7 and 8 as 15,400 yards, the time to reach the firing position 27 minutes may be determined by simple arithmetic as in step 5.

(12) The bearing of the cruiser at the instant of firing is 130.5°, the direction of M2 from point *e*.

(13) The torpedo course is 110°, as determined in step 4 above.

(14) The torpedo speed is the length of the vector *er*$_2$, 39.3 knots.

(15) The torpedo run is 10,500 yards as determined by the actual speed and time, and as in steps 5 and 11 by employing the formula $D=rt$.

*Problem IV.*—The navigator of a plane, air speed 70 knots, obtains the following readings: On a heading of 000° the drift angle is 20° right (clockwise) and on a heading of 090° the drift angle is 15° left, counterclockwise). Required: The force and direction of the wind. Definitions.—Heading: The average direction in which the longitudinal axis of the aircraft is pointed. Air speed: The actual speed of the aircraft through the air measured along the heading. Drift angle: The angular difference between the heading and the course measured right or left from the heading to the course. Course: The intended direction or path of travel over the surface of the earth.

(1) Let the zero position represent point $w$, since point $e$ is to be established. Make sure stop L is against the body of the computer.

(2) In the relative motion triangle shown in Figure 18 the vector $wp$ represents the air speed and heading, but since there are two relative motion triangles in this problem, we shall employ subnumerals to designate points $p_1$ and $p_2$ respectively. Set disk A on 000°. This represents the first heading.

(3) Orient the diametral line 24 of disk B on 020° i. e. 20° to the right of or clockwise from 000°. This represents the first drift angle.

(4) Offset slide H to 70 knots on scale 8. Mark the point $p_1$ thus established with a small cross directly over the center of disk B. The point $e$ is located somewhere on the diametral line 24 (along the radius of this diametral line 20° to the right of the vector $wp_1$). Since the position of $e$ is unknown, mark an additional cross at the extremity of diametral line 24 simply to establish the direction of $p_1e$.

(5) Return slide H to the zero position. Set disk A on 090°. This represents the second heading.

(6) Orient diametral line 24 so that it is 15° to the left of 090° or 075°. This represents the second drift angle. Offset the slide H to 70 knots as in step 4 and mark point $p_2$ as above. Mark an additional cross at the extremity of the diametral line 24 as in step 4.

(7) With the portable scale J establish the point of intersection of the two imaginary lines $p_1e$ and $p_2e$ determined thus far only in direction. This will locate point $e$. Since $ew$ represents the wind vector, return slide H to the zero position and orient diametral line 24 so that it passes through point $e$. Read the velocity and direction of the wind as 46 knots from 232°.

*Problem V.*—A carrier proceeding at a speed of 15 knots, measures the apparent wind as force 20 knots from 032° relative to the ships' heading which is assumed to be 000°. This measurement is made on the carrier's anemometer.

*Required.*—Force of the true wind. Direction relative to the ship's heading of the true wind.

(1) Let the zero position represent point $e$ and make sure stop L is against the body of the computer. The vector analysis of this problem has been described above.

(2) Set disk A on 000° to represent the ship's heading.

(3) Set disk B on 032°. This is the direction from which the apparent wind is blowing.

(4) Offset slide H to 15 knots on scale 8. The center 2 of disk B now serves to establish point $r$ and vector $er$.

(5) The direction of vector $er$ has been established as 000°. The direction of vector $rm$ (the direction of the apparent wind) has been established from 032°. By means of concentric scale 9 on slide H, count 20 knots in the direction from 032° or toward 212°, the reciprocal of 032°. Vector $rm$ will have thus been established.

(6) Orient diametral line 21 of disk C so that it passes through point $m$ at the termination of vector $rm$. The relative direction of the true wind may now be read on disk A as from 079.5°.

(7) Orient disk D so that the spiral line 22 intersects diametral line 21 of disk C at point $m$. Read the velocity of the true wind from peripheral scale 23 of disk D as 10.8 knots.

*Alternate method.*—(1) Let the zero position represent point $r$ and make sure stop L is against the body of the computer.

(2) Offset slide H to 15 knots on scale 8. The center 2 of disk B now serves to establish point $e$ and hence vector $er$.

(3) Set disk A on 180°, the reciprocal of 000° so that vector $er$ may point in the direction 000°.

(4) Orient diametral line 21 of disk C so that it passes through 032° on disk A. This represents the direction from which the true wind is blowing. The vector $rm$ must thus originate at the zero position and extend in the direction 212°, the reciprocal of 032°.

(5) Orient disk D so that peripheral scale 23 of disk D reads 20 knots and the spiral line 22 of disk D intersects the radius of diametral line 21 which extends in the direction 212° from the zero position. Point $m$ will thus have been established.

(6) Orient disk B so that diametral line 24 intersects point $m$ established above. The vector $em$ is now established and the velocity of the true wind may be read on the concentric scale 9 of slide H as 10.8 knots.

(7) To read the direction of the vector $em$, return slide H to the zero position and recalling the relative positions of points $e$ and $m$, read the director of vector $em$ along the proper radius of diametral line 24 of disk B as 079.5°.

In solving relative motion problems of which 2 typical examples are provided, the operation of the second embodiment is as follows:

Since all problems solved by this embodiment are the same, there is no technique for solving them, but merely a procedure to follow. The vector analysis of these problems has already been described above.

*Problem VI.*—A carrier proceeding at a speed of 15 knots, measures the apparent wind as force 20 knots from 032° relative to the ship's heading which is assumed to be 000°. This measurement is made on the carrier's anemometer.

*Required.*—Force of the true wind. Direction relative to the ship's heading of the true wind.

(1) Remove slide O from the computer.

(2) Offset slide P from the zero position a distance on scales 31 and 32 equal to the speed of the ship: 15 knots.

(3) Replace slide O.

(4) Set in 20 knots, the velocity of the relative wind (defined above), on scale 37 beneath the hairline at point 34 by offsetting slide O from the zero position. Set in the direction of the relative wind, 032°, by rotating disk M until the desired graduation of degrees representing this direction is shown beneath the hairline at point 35.

(5) Orient the diametral line 36 engraved on the surface of disk N so that it passes through the center 26 of rose 39.

(6) The distance from the center 28 of slide O to the center 26 of rose 39 represents the velocity of the true wind (defined above) and may be estimated closely by employing the concentric scale 38 engraved on the surface of slide O. The velocity equals 10.8 knots. It will be noted that the diametral line 36 engraved on the surface of disk N intersects the graduations of rose 39 in one or possibly two places. Read the relative direction of the true wind (the true wind measured relative to the ship's heading) on rose 39 in the direction from the center 26 of rose 39 toward the center 28 of slide O. This direction is 079.5°.

*Problem VII.*—Situation: A destroyer on course 145°, speed 33 knots is about to lay a smoke screen and wishes to determine the true wind. As measured from the ship, the wind appears to be 21 knots from 336° relative to the ship's heading.

*Required.*—The force and relative direction of the true wind.

(1) Disregard the course of 145° since this computer only gives directions relative to the ship's heading which is assumed to be 000°. To get a true direction of the true wind add 145° to the answer.

(2) Remove slide O from the computer.

(3) Offset slide P from the zero position distance on scales 31 and 32 equal to the speed of the ship: 33 knots.

(4) Replace slide O.

(5) Set in 21 knots, the velocity of the relative wind (defined above) on scale 37 beneath the hairline at point 34 by offsetting slide O from the zero position. Set in the direction of the relative wind 336° by rotating disk M until the desired graduation of degrees on scale 40 representing this direction is shown beneath the hairline at point 35.

(6) Orient the diametral line 36 engraved on the surface of disk N so that it passes through the center 26 of rose 39.

(7) The distance from the center 28 of slide O to the center 26 of rose 39 represents the velocity of the true wind and may be estimated closely by employing the concentric scale 38 engraved on the surface of slide O. The velocity equals 18.0 knots. Read the relative direction of the true wind on rose 39 in the direction from the center 26 of rose 39 toward the center 28 of slide O. This direction is 215°. The true direction of the true wind is 000°; 215°+145°=000°.

It is to be understood that I do not limit myself to the showing made by the said drawings and descriptions, as I may adopt variations of the preferred form within the scope of my invention as set forth in the claims.

I claim:

1. A navigational computer comprising a base member consisting of a bottom portion, a disk pivoted to said base member above said bottom portion, guiding means disposed on said bottom portion, a transparent slide movable in said guiding means transversely of said base member, a zero-indicator mark on said base member, said slide having marked on its surface a scale and a series of concentric circles with the radii of the circles differing by uniform increments, the slide being in zero position when the zero on its scale registers with the zero-indicator mark on said base member, and a disk above said first-mentioned disk and having marked on its surface a diametral line and pivoted about its center and to said slide at a point which, when the slide is in zero position, is coaxial with the axis of pivoting of said first-mentioned disk.

2. A navigational computer comprising a base member consisting of an opaque bottom portion, a disk pivoted to said base member above said bottom portion, means movable with respect to said disk to take care of the speed of the true wind, guiding means disposed on said bottom portion, a transparent slide movable in said guiding means transversely of said base member, a zero-indicator mark on said base member, said slide having marked on its surface a scale and a series of concentric circles with the radii of the circles differing by uniform increments, the slide being in zero position when the zero on its scale registers with the zero-indicator mark on said base member, and a disk above said first-mentioned disk and having marked on its surface a diametral line and pivoted about its center and to said slide at a point which, when the slide is in zero position, is coaxial with the axis of pivoting of said first-mentioned disk.

3. A navigational computer comprising a base member consisting of bottom plate, a transparent plate secured thereabove and with intermediate portions spaced therefrom, a transparent disk carrying a diametral line and pivoted to the bottom of said transparent plate, a disk pivoted coaxially beneath said transparent disk and having marked thereon a spiral and a peripheral scale showing the divergence of the spiral from the center, a transparent flap member movably mounted above said transparent plate, carrying a zero-indicator mark, and with intermediate portions normally spaced therefrom to provide a slot between it and the transparent plate, a transparent slide movable transversely in said slot, said slide having marked on its surface a scale and a series of concentric circles with the radii of the circles differing by uniform increments, the common center of said circles being coincident with the point of pivoting of said disks when said scale is in zero position with respect to said mark, said slide carrying a stop to prevent movement in one direction beyond said zero position, a disk pivoted about said center and to said slide, said disk having marked on its surface a diametral line and a series of lines on either side thereof, parallel thereto, and spaced uniform distances, and a transparent disk pivoted to said flap, coaxially with the first two disks mentioned, and with its edge portion graduated in degrees.

4. A navigational computer comprising a base member consisting of an opaque white bottom plate, a transparent plate secured thereabove and with intermediate portions spaced therefrom, a transparent disk carrying a diametral line and pivoted to the bottom of said transparent plate, the edge of said transparent disk being guided by the spaced opaque and transparent plates, a smaller disk pivoted coaxially beneath said transparent disk and having marked thereon a spiral and a peripheral scale showing the divergence of the spiral from the center, the opaque bottom plate being cut away to accommodate said smaller disk, a transparent flap member hinged above said transparent plate, carrying a zero-indicator mark, and with intermediate portions normally spaced therefrom to provide a slot between it and the transparent plate, a transparent slide movable transversely in said slot, said slide having marked on its surface a scale and a series of concentric circles with the radii of the circles differing by uniform increments, the common center of said circles being coincident with the point of pivoting of said disks when said scale is in zero position with respect to said mark, said slide carrying a stop to prevent movement in one direction beyond said zero-position, a disk pivoted about said center and to said slide, said disk having marked on its surface a diametral line and a series of lines on either side thereof, parallel thereto, and spaced uniform distances, and a transparent disk pivoted to said flap, coaxially with the first two disks mentioned, and with its edge portion graduated in degrees, whereby navigational problems may be solved by relatively moving the disks and slides with respect to the base member, in accordance with the data of the problem, the elements of which are set up in the computer on the slide and disks thereof.

5. A navigational computer comprising a base member consisting of an opaque white bottom plate, a transparent plate secured thereabove and with intermediate portions spaced therefrom, a transparent disk carrying a diametral line and pivoted to the bottom of said transparent plate, a second disk pivoted concentrically beneath said transparent disk and carrying a spiral and a peripheral scale showing the divergence of the spiral from the center, the opaque bottom plate being cut away to accommodate said second disk, a transparent flap member hinged above said transparent plate carrying a zero-indicator mark, and with intermediate portions normally spaced therefrom to provide a slot between it and the transparent plate, a transparent slide movable transversely in said slot, said slide having marked on its surface a scale and a series of concentric circles and segments, with the radii of the circles and segments differing by uniform increments, the common center of said circles and segments being coincident with the point of pivoting of said disks, when said scale is in zero position with respect to said mark, said slide carrying a stop to prevent movement in one direction beyond said zero position, a disk pivoted about said center and to said slide, said disk carrying a diametral line and a series of equally spaced lines on either side thereof and parallel thereto, and a transparent third disk pivoted to said flap, coaxially with the first two disks mentioned, and with its edge portion graduated in degrees, whereby navigational problems may be solved by relatively moving the disks and slides with respect to the base member, in accordance with the data of the problem, the elements of which are set up in the computer on the slide and disks thereof.

6. A navigational computer comprising a base member having a bottom portion, a disk pivoted to said base member above said bottom portion, a compass rose mounted for slidable movement along a diameter of said disk, a scale parallel to said diameter and registering with respect to said rose, guiding means disposed on said bottom portion, a transparent slide movable in said guiding means transversely of said base member, a zero-indicator mark on said base member, said slide having marked on its surface a scale and a series of concentric circles with the radii of the circles differing by uniform increments, the slide being in zero position when the zero on its scale registers with the zero-indicator mark on said base member, and a second disk having marked on its surface a diametral line, and pivoted about its center and to said slide at a point which, when the slide is in zero position, is coaxial with the axis of pivoting of the first-mentioned disk.

7. A navigational computer comprising a base member having an opaque bottom plate, a disk pivoted to said bottom plate, a compass rose mounted for slidable movement along a diameter of said disk, a scale on said disk parallel to said diameter and registering with respect to said rose, a transparent member, slidable transversely with respect to said plate, a zero indicator on said plate, a second disk pivoted about its center and to said slidable member, said disk carrying a diametral line, said slidable member having engraved on its surface a scale to show zero position when its zero mark registers with the zero indicator and amount of offset, and a series of concentric circles and segments spaced a uniform distance apart, the common center of said circles and segments being coincident with the point of pivoting of said second disk, whereby navigational problems may be solved by relatively moving the disks and slides with respect to the base member in accordance with the data of the problem, the elements of which are set up in the computer on the slide and disks thereof.

References Cited in the file of this patent

UNITED STATES PATENTS

| | | |
|---|---|---|
| 2,433,249 | Van Sciever | Dec. 23, 1947 |
| 2,438,730 | Watter | Mar. 30, 1948 |
| 2,449,342 | Tardif | Sept. 14, 1948 |
| 2,545,935 | Warner | Mar. 20, 1951 |